Patented Sept. 13, 1949

2,481,922

UNITED STATES PATENT OFFICE 2,481,922

REDUCTION-HYDROLYSIS OF NITRO-BENZENES TO CYCLOHEXANOLS

Glenn Frederick Hager, Wilmington Del., assignor to E. I. du Pont de Nemours & Company, Wilmington, Del., a corporation of Delaware No Drawing. Application December 5, 1946, Serial No. 714,131

8 Claims. (Cl. 260—631)

This invention relates to a process for the production of alicyclic alcohols and more particularly to a catalytic process using nitrobenzene or one of its alkyl homologues as starting material.

Cyclohexanol is one of the more important alicyclic alcohols commercially and finds important applications as a chemical intermediate and solvent. One of two methods has been commonly used in its industrial preparation, either by the hydrogenation of phenol or by the oxidation of cyclohexane. Neither of these methods is altogether satisfactory, the first involving the use as starting material of a relatively expensive intermediate, while the second has the disadvantage of low yields. Although different starting materials are required, the preparation of other alicyclic alcohols by similar methods likewise meets drawbacks in the way of expensive and difficultly obtainable starting materials and low yields.

An object of the present invention is a novel process for the manufacture of alicyclic alcohols by the catalytic hydrogenation and hydrolysis in the gas phase of nitrobenzene or of one of its alkyl substitution products. A further object is the production of cyclohexanol from nitrobenzene by such a process. A still further object is such a process operating at substantially atmospheric pressure and employing a catalyst of particular effectiveness. Additional objects will be disclosed as the invention is described more at length hereinafter.

I have found that the foregoing objects are accomplished when I contact with hydrogen and water vapor in the presence of a hydrogenation catalyst a compound in vaporous form comprising nitrobenzene or one of its alkyl substitution products and maintain a temperature between 175° C. and 220° C. throughout the reaction. Desirably substantially atmospheric pressure conditions will prevail. While various hydrogenation catalysts may be used, I find it advantageous to employ a chromite of a hydrogenating metal, and I prefer to use nickel chromite, either by itself or modified by additions of other materials.

The following will serve as specific examples of procedures for carrying out the invention. It will be understood, however, that these are given as illustrative only and are not to be taken as limiting in any way.

Example 1

A reactor tube was charged with a catalyst comprising a 90–10 nickel-copper chromite, the catalyst comprising 212 cc. in volume. The reactor tube was provided with heating means permitting independent temperature control of various sections. Previous to carrying out the operation, reduction of the catalyst was effected in situ by passing a slow stream of hydrogen through the tube for 16 hours while maintaining the temperature at 450° C.

After cooling the catalyst zone to 200° C., the hydrogen flow was regulated to a rate of 31 liters per hour. Liquid nitrobenzene and water were fed into the vaporizer simultaneously at rates of 6.15 grams and 18.6 grams per hour respectively, so that their vapors would pass through the reactor tube and over the catalyst with the hydrogen. Under these conditions the space velocity was 260 volumes of reactants (calculated as gas at standard temperature and pressure conditions) per unit volume of catalyst per hour, the contact time was 8 seconds, and the molar ratio of water-hydrogen-nitrobenzene was 20–28–1. The reaction within the first 2 inches of the catalyst bed was highly exothermic but the temperature of the entire bed was kept at about 200° C. An organic upper layer of water-white reaction product was separated, while the lower aqueous layer was extracted with three portions of ether. The combined extracts and organic layer were dried over anhydrous calcium sulfate, and the products isolated by fractional distillation. The amount of nitrobenzene introduced during 15.7 hours of operation was 96 grams, from which 33.5 grams of cyclohexanol was obtained, together with 2.5 grams of benzene, 4.0 grams of cyclohexylamine, 13.0 grams of dicyclohexylamine, and 3.3 grams of phenylcyclohexylamine. This represented a 42.7% conversion of nitrobenzene to cyclohexanol.

Example 2

The reactor tube was charged with 200 cc. of nickel chromite catalyst, and the catalyst was reduced, as before, by heating at 450° C. while a slow stream of hydrogen was being passed through. The temperature was then adjusted to 200° C. Hydrogen was flowed through at the rate of 31 liters per hour, while 6.24 grams of liquid nitrobenzene and 27 grams of water were vaporized. The mixture of nitrobenzene, hydrogen and water vapors was passed over the catalyst at a space velocity of 328 volumes of reactants calculated as gas per unit volume of catalyst per hour and with a contact time of 6.3 seconds. From 109 grams of nitrobenzene processed during 17.5 hours, 50.9 grams of cyclohexanol was obtained, together with 12 grams of cyclohexylamine, 9.5 grams of dicyclohexylamine and 7.7 grams of N-phenlycyclohexylamine. This constituted a 57% conversion at 89% yield of cyclohexanol based on the nitrobenzene.

Example 3

Water and nitrobenzene were vaporized at the respective rates of 27 and 6.0 grams per hour and the vapors, mixed with hydrogen flowing at a rate of 31 liters per hour, were passed over 200 cc. of reduced nickel chromite catalyst at 180° C. This corresponded to a space velocity of 328 volumes of reactants calculated as gas per unit volume of catalyst per hour and a contact time of 6.6 seconds. From 84 grams of nitrobenzene processed in 14 hours, 32.6 grams of cyclohexanol was obtained, along with 2.7 grams of benzene, 5.1 grams of cyclohexylamine, 3.3 grams of aniline and 12.4 grams of N-phenylcyclohexylamine, corresponding to a 49.2% conversion of nitrobenzene to cyclohexanol.

Example 4

In the same manner, p-nitrotoluene and water were passed through a vaporizer at rates of 5.5 and 27 grams per hour, and a flow of hydrogen at the rate of 31 liters per hour was blended with the vaporized materials, the whole mixture being passed over 200 cc. of a reduced nickel-copper (90–10) chromite catalyst, maintained at a temperature of 200° C. This represented a space velocity of 328 volumes of calculated gaseous reactants per unit volume of catalyst per hour at a contact time of 6.3 seconds. From 91.2 grams of p-nitrotoluene processed, 7.9 grams of 4-methylcyclohexanol was obtained, together with 23.6 grams of toluene, 0.6 grams of 4-methylcyclohexylamine, 16.7 grams of p-toluidine, and 12.4 grams of a mixture of 4,4'-dimethyldicyclohexylamine and N-(p-tolyl) - 4 - methylcyclohexylamine. This amounted to a 10.4% conversion of p-nitrotoluene to 4-methylcyclohexanol.

In carrying out the process of the present invention various hydrogenation catalysts may be used, particularly chromites of metals forming hydrogenating oxides, for example, chromites of nickel and cobalt alone or modified with the chromites of copper, cadmium, or zinc. Nickel chromite either alone or modified with the above mentioned chromites or with alumina, lime, silica, pumice, or a hydrous chromium oxide is the preferred catalyst by virtue of its superior performance.

It is important in the practice of the invention to carry out the reaction under carefully controlled conditions of temperature within the range of 175° C. to 220° C. Lower temperatures do not permit a practical rate of reaction, while higher temperatures favor the initiation of uncontrollable reactions, whereby excessive decomposition of nitrobenzene takes place with formation of products such as benzene, ammonia, carbon dioxide, carbon monoxide and hydrogen. Desirably approximately atmospheric pressure is maintained throughout the reaction.

While operating the process within the preferred temperature range, the velocity at which the gaseous reaction mixture is passed over the heated catalyst is dependent upon the volume and shape of the reaction space, the size and active contact surface of the catalyst particles, and the relative proportion of the reactants. In general, the process can be operated by passing the gaseous reactants over the catalyst at a space velocity, measured at standard temperature and pressure conditions, between 200 and 400 volumes of gas per unit volume of catalyst per hour and with a contact time of 5–11 seconds. Preferably I operate at a space velocity of approximately 300 reciprocal hours and a contact time of approximately 6–8 seconds.

The proportions of gaseous reactants may be varied over a wide range. Preferably, however, a water to nitrobenzene molar ratio between 10 and 40 to 1 is used. While a hydrogen to nitrobenzene molar ratio of 12–30 to 1 may desirably be employed, to obtain the best yields of cyclohexanol a ratio of 24–30 to 1 should be used.

The present invention is intended to cover all reactions in which "a nitrobenzene" is contacted under the conditions described with hydrogen and water vapor, whereby simultaneous reduction and hydrolysis bring about the formation of an alicyclic alcohol. While the preferred application is to the production of cyclohexanol from nitrobenzene itself, because of the greater stability of its reduction products, I intend to include also under the term "nitrobenzene," as materials applicable to reduction according to the invention, alkyl substitution products of nitrobenzene, for example, para-nitrotoluene, ortho-, and meta-nitrotoluenes, ortho-, meta-, and para-nitroxylenes; and the like.

While the invention has been described at length in the foregoing, it will be understood that various modifications in details of compositions, conditions and procedures may be introduced without departure from the spirit of the invention. I intend to be limited, therefore, only by the following claims.

I claim:

1. A gas phase process for the manufacture of cyclohexanol and alkyl substituted cyclohexanol in one step, which comprises reacting in the vapor phase at substantially atmospheric pressure with hydrogen and water vapor in the presence of a catalyst selected from the class of chromites of metals forming hydrogenating oxides, a compound taken from the group consisting of nitrobenzene and its alkyl substitution products, and maintaining a temperature between 175° C. and 220° C. throughout the reaction.

2. A gas phase process for the manufacture of cyclohexanol and methyl substituted cyclohexanol in one step, which comprises reacting in the vapor phase at substantially atmospheric pressure with hydrogen and water vapor in the presence of a catalyst selected from the class of chromites of metals forming hydrogenating oxides, a compound taken from the group consisting of nitrobenzene and its methyl substitution products, and maintaining a temperature between 175° C. and 220° C. throughout the reaction.

3. The process of claim 1, in which a nitrotoluene is converted to an alkylcyclohexanol.

4. The process of claim 1, in which a nitroxylene is converted to a dialkylcyclohexanol.

5. A process of the manufacture of cyclohexanol, which comprises effecting the reduction and hydrolysis of nitrobenzene in one step by reacting it in the gas phase with hydrogen and water vapor at substantially atmospheric pressure in the presence of a catalyst selected from the class of chromites of metals forming hydrogenating oxides, and maintaining a temperature between 175° C. and 220° C. throughout the reaction.

6. The process of claim 5, in which the catalyst comprises a nickel chromite.

7. The process of claim 5, in which the molar ratio of hydrogen to nitrobenzene is between 12 and 30 to 1.

8. The process of claim 5, in which the molar ratio of water to nitrobenzene is between 10 and 40 to 1.

GLENN FREDERICK HAGER.

REFERENCES CITED

The following references are of record in the file of this patent:

UNITED STATES PATENTS

| Number | Name | Date |
|---|---|---|
| 2,087,691 | Lazier | July 20, 1937 |

FOREIGN PATENTS

| Number | Country | Date |
|---|---|---|
| 214,404 | Switzerland | Apr. 30, 1941 |